Patented Feb. 17, 1942

2,273,527

UNITED STATES PATENT OFFICE 2,273,527

TREATMENT OF PECTINOUS MATERIAL

Glenn Howe Joseph, Corona, Calif., assignor to California Fruit Growers Exchange, Los Angeles, Calif., a corporation of California No Drawing. Application February 26, 1936, Serial No. 65,926. In Canada February 28, 1935

24 Claims. (Cl. 260—210)

This invention relates to the treatment of source materials containing pectinous substances whereby certain fundamental changes are made in certain of the inherent characteristic properties of the pectinous substances.

It now seems rather well established that pectin occurs in plant tissues principally in the form of protopectin. In some cases, a relatively small proportion of the pectin seems to be present in the plant tissue in the form of water-soluble pectin. Protopectin is an insoluble substance from which soluble pectin can be liberated in various ways. The most common commercial method of doing this is to extract the pectin from the protopectin by heating the latter in acidified water.

The most common commercial sources of pectin at the present time are apples and citrus fruits. Many other plant materials, and in particular beets, are often referred to as potential sources of pectin.

In the preparation of pectin, the usual commercial process is to grind, wash, and purify the source material to the desired extent, extract the pectin from the source material, filter off and discard the source material and then proceed with the handling of the pectin extract in the desired manner.

It has been proposed to purify the source material as, for example, the peel of citrus fruit, by drying it and repeatedly washing it with alcohol or other solvent that does not dissolve or disperse pectin. This product is then to be used for making jam or jelly. In this product, the pectin remains in insoluble form and must be converted to the soluble form during the process of utilization.

It has likewise been proposed to subject the pectinous material to an acidic extraction step to extract the pectin, and then precipitate the whole mass from aqueous solution as, for example, by means of alcohol. In such a process the residual insoluble or semi-soluble cellulosic and pulpy constituents are carried down by the precipitating pectin.

I have now discovered that it is possible to convert the pectin of the protopectin into a water-soluble form without physically removing it from the cellulosic portions of the pulp with which it is associated as it occurs in nature. This new product has great potential significance.

In a preferred form of my process, I likewise modify the setting time of the pectin that may be obtained from the pectinous source material. The setting time of a pectin is a fundamentally inherent characteristic which may, nevertheless, be changed. It is known to alter the setting time of pectin during extraction of pectin from the source material or subsequent to the extraction. This invention embodies the important discovery that it is possible to alter at will the setting time characteristic of the eventual pectin without extracting it from its cellulosic source material.

For the various uses to which pectin may be put, a variety of setting times may be required. Different source materials and extraction methods produce pectins with differing and generally uncontrollable setting characteristics. Normally a weak acid or water extraction of a pectinous source material will produce a pectin having a very short setting time. My present invention makes it possible to change in the desired direction the setting time of pectin to be obtained from the source material.

Generally stated, the method comprises contacting the pectin-bearing source material with a reagent adapted to alter materially the intrinsic setting time of the pectin to be extracted therefrom, and maintaining the reagent in contact with said pectin-bearing source material for a time and at a temperature insufficient to destroy the gelation characteristics of the pectin, or materially affect the texture of the gel which may subsequently be formed from the pectin obtained from such treated material.

The treating reagent, before being brought into contact with the pectin-bearing source material may be either liquid or gaseous, aqueous or anhydrous. The preferred reagent is an acid, an acidic, or an acid-forming substance. For convenience in handling and application of the reagent, a liquid may be used as a carrier. An inorganic acid in a medium that does not dissolve pectin illustrates a desirable treating agent.

Accordingly, an object of this invention is to provide and disclose methods and means of altering the inherent setting time characteristic of pectin prior to its extraction from its cellulosic source material.

A further object of this invention is to provide and disclose methods and means of treating pectin-bearing source materials, of various degrees of purity, for the purpose of changing the inherent setting time characteristics of the pectic substance therein contained, and in particular to retard the setting rate or lengthen the setting time.

Another object of this invention is to provide and disclose methods and means of treating various pectin-bearing source materials so that a subsequent weak acid or water extraction performed upon the treated material will yield a pectin having a relatively slow setting rate.

Other objects and advantages will appear more fully and at large hereinafter, and will be apparent from a description of a preferred process and product embodying the invention, and will present themselves to those skilled in the art in the contemplation and use of the invention.

It is to be understood that this invention is directed to the treatment of cellulosic source materials prior to the extraction of the pectin therefrom. The process is applicable to various source materials, for example, citrus peel and apple pomace. The materials treated may be in a crude, unpurified state, or may be extensively purified. The materials may contain appreciable quantities of water or may be substantially dry.

In general, my process may be carried out as follows:

To a quantity of the pectinous material may be added a somewhat larger quantity of acidified alcohol. The mixture may then be allowed to stand at a suitable temperature and for a sufficient length of time for the inherent setting time characteristics of the pectin to become sufficiently altered. The material may then be dried in a suitable manner. If the pectin is to be extracted immediately, however, the treated material need not be dried, but may be freed from the alcohol by suitable means. The pectin may be extracted at once as, for example, with hot water or a dilute acid solution.

If the pectinous material is to be dried, it should first be given a rinse with an alkaline substance or acid-buffering substance, or repeated alcohol rinses, preferably after the acid-alcohol has been removed. After the rinse the material may be dried and ground and stored for future use. The agents employed in the rinse should be of sufficient strength and in sufficient amounts to reduce the residual acidity of the pectic material so that the pH of the rinse would come, at equilibrium, within the range of about pH 2.5 to about pH 4.5. Slightly higher pH values are effective but less desirable.

The pH values as used in the specification and appended claims were determined electrometrically by means of a quinhydrone electrode used in conjunction with a saturated calomel half-cell, the system being standardized against Clark and Lubs buffer solutions, or colorimetrically by means of a spot-plate and buffers, in accordance with the usual practice.

A specific example of the application of this process is as follows:

Lemon peel is prepared from whole lemons by reaming the pulp and juice from the halved fruit, grinding the peel at once and dropping it into alcohol and later drying it after pressing out the alcohol. To about 200 parts by weight of such dry peel is added about 1000 parts by weight of 70% ethyl alcohol acidified with 125 parts of concentrated hydrochloric acid (sp. gr. 1.19, equivalent to 37.5% HCl). The temperature of the mixture is adjusted to about 35° C. and held at that temperature for about 16 hours.

The alcohol is 70% by volume ethyl alcohol, and the balance water. Any suitable denaturant may be included in the alcohol so long as the denaturant in the amount used does not have an unfavorable effect on the results sought.

In the course of this treatment the pectin originally present as protopectin and, in that form, substantially insoluble in hot water, is converted to a form readily soluble in hot water. Moreover, it will be found upon extracting the pectin with hot water or a weak acid solution that a slow-setting pectin will be obtained although these processes ordinarily give very fast setting-pectin.

After the storage treatment, the alcoholic liquor is removed by suitable means. If the peel is to be dried, it is rinsed, preferably with approximately 1000 parts of alcohol. It is desirable to add to this rinse an amount of an alkaline or buffering material sufficient to raise the pH of the rinse at equilibrium with the rinsed peel to within the range of about 2.5 to about 4.5. I prefer to do this by adding $NH_4OH$. However, other alkaline materials and even buffering salts are equally effective. The $NH_4OH$ is added to the alcohol with agitation. Any additional amount of $NH_4OH$ that may be necessary to effect the desired pH can be determined by testing the pH of the rinse during rinsing. This should be done at frequent intervals. These tests may suitably be made by dropping a drop of the rinse on a spot plate and adding to it one drop of Thymol Blue indicator solution. If the indicator changes from light red to a yellow buff, the rinse is sufficiently alkaline. If, after a period of about 15 minutes more, the rinse is again tested as above and shows the yellow buff color, it may be assumed to be sufficiently alkaline. If, however, it shows a pink coloration, more $NH_4OH$ needs to be added, though care should be taken that too much is not added so that the pH may not go too high. This condition may be determined by using an indicator solution of Brom phenol blue which shows a purple coloration at a pH of about 4.5.

The principal purpose of the alkaline or buffering rinse is to reduce the residual acidity of the pectin to a point where the pectin will not be injured by the acidity during the drying operation.

After an equilibrium has about been reached between the acid peel and the alkaline rinse, and the pH lies within the aforementioned range, the alcohol may be separated from the peel and the peel dried by suitable means.

Such treated peel, when dried and ground may be used, as such, for jams and jellies, although it is preferably used for the manufacture of jams.

When it is found expedient to extract the pectin from such treated peel, it may be done in any suitable manner. A hot water extraction is an example of such a method which yields an excellent pectin extract without the further use of acids. Since pectin seems to be somewhat more readily soluble in acidulated water than in pure water, a weak acid extract may suitably be prepared if desired.

Attention is called to the fact that after the setting rate of a pectin has been retarded by treatment with acid as hereinabove described, the setting rate can subsequently be accelerated (setting time shortened) by treatment with acid in the presence of methyl alcohol. The setting time of a pectin can thus be altered in either direction as desired.

The treating agent should contain an acid or acidic component. When organic liquids are used as media for the acidic components, any of the mineral acids may be used whenever the organic liquid is a solvent therefor. For example, sulfuric, sulfurous, phosphoric, and nitric acids are suitable. Others may be used. Hydrochloric acid is the preferred acid. Organic acids such as lactic may also be used. The reagent used in obtaining the desired alteration in setting time of pectin may be anhydrous.

The treating agent may comprise an acidic substance, such as chlorine, hydrogen sulfide, sulfur dioxide or sulfur trioxide.

Pectin-bearing materials, containing about 2% to 10% of moisture may be contacted with any of these acidic gases, and an alteration in setting time obtained. Dry hydrogen chloride gas may also be used, either alone or dissolved in alcohol, benzol, or the like, on pectin-bearing source materials.

An acidic material such as acid methyl sulfate may be used without any additional carrier.

It appears that any acid or acid radical may be employed provided it is of sufficient activity and has no destructive action upon any of the constituents of the mixture. The more active acids produce retardation of the set in a shorter treating time than less active acids. The concentration of the acid used may also vary over a wide range, for example, from 0.5% to as high as 25% HCl, the concentration of acid used being influenced by the time and temperature conditions which it is desired to use. The higher the concentration of the acid, the shorter the treating time. With solutions containing high concentrations of acid, a treating time of only a few minutes may be sufficient. The use of very high concentrations of acid is not recommended, however, as some degradation of the pectin and a loss in jelly strength or jelly units may result.

Dilution of the organic liquid used as a carrier for the acid influences the rapidity with which the setting time of the pectin to be obtained is altered with a given contacting period and at a given temperature and acid concentration.

The term "setting time" as used herein means that interval of time which elapses between the instant all the ingredients of the jelly batch, consisting of standard proportions of sugar, pectin, acid, and total solids, are placed in the final container, after cooking, and that instant at which gelation of the whole into a coherent mass may first be observed. The values for setting times given herein were obtained by pouring the jelly immediately at the end of the cook into a six ounce jelly glass maintained in a water bath having a constant temperature of about 25° C.

Table I given below illustrates the effect on the setting time of the resulting pectin obtained by using various concentrations of ethyl alcohol in the treating system.

In these runs portions of alcohol-dried lemon peel prepared as described above were stored in the various treating mixtures for a period of 16 hours at a temperature of 35° C. Alcohol of the indicated strength by volume was added to the dried peel in the proportion of 5 liters of alcohol to 1 kilogram of dried peel. To this mixture concentrated hydrochloric acid was added in the proportion of 750 ml. per 5 liters of alcohol.

After the treated peel had been well rinsed as described above, a hot water extraction was made on it. The pectin from the resulting extract was precipitated by the use of 95% ethyl alcohol and standard jellies were made in the usual way.

*Table I*

| Strength of alcohol | Weight anhydrous alcohol in batch | Grade as recovered | Ash and H₂O free grade | Time of set (in air) | | Time of set 20-25° C. | |
|---|---|---|---|---|---|---|---|
| | | | | Min. | Sec. | Min. | Sec. |
| Percent | Percent | | | | | | |
| 90 | 59.0 | 200 | 242 | 4 | 30 | 3 | 12 |
| 80 | 51.0 | 205 | 251 | 9 | 00 | 4 | 36 |
| 70 | 43.8 | 210 | 247 | 13 | 30 | 5 | 24 |
| 60 | 36.8 | 210 | 247 | 13 | 30 | 5 | 24 |

In the above table the times of set are given for determinations in the manner indicated above, and also for determinations in which the jelly glass is simply allowed to stand with no other cooling than its contact with the air at room temperature. These figures are given to make possible a comparison of the relative values obtained by the two methods of determining the setting time.

To further illustrate the results obtainable by the application of my invention there are given in Table II the effects of varying the concentration of acid, the temperature of treatment, and the time of treatment.

*Table II*

| Conc. HCl | Temperature | Time | Set |
|---|---|---|---|
| | °C. | Hours | |
| 25 ml | 35 | 16 | 15 sec. |
| 40 ml | 35 | 16 | 22 sec. |
| 55 ml | 35 | 16 | 55 sec. |
| 75 ml | 35 | 16 | 1 min. 50 sec. |
| 100 ml | 35 | 16 | 2 min. 45 sec. |
| 125 ml | 35 | 16 | 3 min. 25 sec. |
| 150 ml | 35 | 16 | 5 min. 24 sec. |
| 125 ml | 25 | 16 | Under 45 sec. |
| 125 ml | 30 | 16 | 2 min. |
| 125 ml | 35 | 16 | 3 min. 30 sec. |
| 125 ml | 40 | 16 | 5 min. 13 sec. |
| 125 ml | 45 | 16 | 4 min. 30 sec. |
| 125 ml | 35 | 6 | 30 sec. |
| 125 ml | 35 | 12 | 2 min. 20 sec. |
| 125 ml | 35 | 18 | 4 min. |
| 125 ml | 35 | 24 | 4 min. 30 sec. |
| 125 ml | 35 | 36 | 5 min. 15 sec. |

To enable uniform comparisons throughout, the determinations set forth in Table I and in Table II are all on portions of the same original alcohol dried peel.

For the determinations given in Table II, alcohol (70% by volume) was employed in the proportion of 5 liters of alcohol to 1 kilogram of the dried peel being treated. To the mixture of these materials, concentrated hydrochloric acid was added. Table II sets forth the number of milliliters of concentrated acid employed per liter of alcohol.

The setting times given in Table II are for determinations made by maintaining the jelly glass in a water bath in the manner described above.

It is to be understood that extractions from an original pectinous material with hot water or weak acid give a pectin having a setting time of only a very few seconds. Thus, to increase the setting time to 2 minutes or 2½ minutes may represent a percentage increase in the neighborhood of 1200% to 1500%.

From the tables above it will appear that a highly satisfactory commercial result may be obtained by treating the peel at 35° C. for 16 hours with hydrochloric acid in the proportion of 125 milliliters per liter of 70% alcohol.

It is not desirable to dilute the alcohol too far since this tends to encourage hydration of the material being treated, giving rise to difficulties in handling it.

All of the treatments referred to above and specifically set forth in the above tables are sufficient to convert a substantially major portion of the originally water-insoluble pectin to a water-soluble condition. The alcohol dried peel has only a small portion of its pectin present as water soluble pectin. This is shown by the following test. One part of dried peel was mixed with 20 parts of water. This mixture was maintained at a temperature of 90° C. for three quarters of an hour. This was filtered and the pectin precipitated from the filtrate with alcohol. This yielded only 3.4% of air-dried pectin on the basis of the dried peel taken. It is probable that a considerable portion of the pectin that was thus obtained was not originally present as water-soluble pectin but was hydrolyzed during the time of treatment.

The setting time of the pectin prepared as described in the previous paragraph was 17 seconds, when determined in the manner described above.

The effect of variation of time of treatment on the yield of pectin is set forth in Table III. For these determinations, portions of the same alcohol-dried peel were used. Seventy percent alcohol was employed in the proportion of 5 liters of alcohol to each kilogram of dried peel. Concentrated hydrocholric acid was added in the proportion of 750 milliliters per 5 liters of alcohol. The temperature was maintained at 35° C.

*Table III*

| Time of treatment | Yield of pectin |
| --- | --- |
| | Per cent |
| ¼ hour | 10.0 |
| 2 hours | 12.5 |
| 6 hours | 15.0 |
| 12 hours | 17.0 |
| 16 hours | 18.0 |
| 18 hours | 19.0 |

Time of treatment in excess of 18 hours under the conditions outlined above did not give an increased yield of pectin.

It is to be understood that the percentage yield of pectin in each case was determined by first removing the treated peel from the treating solution, then rinsing it in the manner described above and drying it. Then each was extracted with water, in the ratio of 45 parts of water to 1 part of dried treated peel, at 90° C. for 45 minutes. The extracts were then filtered and precipitated with alcohol and the pectin dried. The percentage yields of pectin are as dry pectin on the basis of the dried, treated peel taken for the hot water extraction of the pectin.

It is not to be understood that the invention is in any way limited to the treatment of pectinous source materials that are first alcohol dried. The tests outlined above are given on the basis of alcohol-dried peel because with this material it is possible to prepare a large amount of material which can be thoroughly intermixed and thus be sure that all portions taken are reasonably uniform in composition. Likewise, such a material can be kept for reasonably long periods without material changes so that in all parts of an extensive investigation, there is reasonable surety that the work is being done on a uniform source material.

My method is equally applicable to pectinous source materials of other types, whether fresh or dried in some other manner, or otherwise prepared for keeping.

My method gives satisfactory results with apples.

As an illustration of the application of my method to a freshly obtained source of pectin, I give the following example:

Fresh, ground lemon peel was treated with 70% ethyl alcohol acidified with hydrochloric acid. The proportions were 6 kilograms of the fresh, ground peel to 10.5 liters of alcohol and 1.2 liters of concentrated HCl. This was maintained at a temperature of 30° C. for 16 hours. At the end of this treatment, the peel was rinsed in the manner described above and dried. This gave a yield of about 9% treated dried peel on the basis of the original wet peel. This is about normal since fresh lemon peel ordinarily runs about 90% moisture.

Treatment of 100 parts of peel prepared as described in the preceding paragraph with 5000 parts of water at 95° C. for three quarters of an hour yielded, after precipitation with alcohol and drying, 26 parts of 200 grade pectin having a setting time of 2 minutes and 4 seconds when determined in the manner described above.

The preferred organic liquids used as media for pectin-bearing materials contain the methyl radical, the acetyl radical or a saturated alkyl group. Specific examples of such liquids are methyl alcohol, ethyl alcohol, normal propyl alcohol, isopropyl alcohol, normal butyl alcohol, isobutyl alcohol, secondary butyl alcohol, tertiary butyl alcohol, amyl alcohol, isoamyl alcohol, ethyl ether, acetone, methyl ethyl ketone, acetyl chloride, ethyl acetate, acid methyl sulfate, etc.

Among other liquids which may be used are aliphatic and aromatic hydrocarbons and their derivatives, the preferred liquids being the simpler aliphatic hydrocarbon derivatives such as alcohols, ketones, aldehydes, and ethers and the aromatics of low molecular weight, such as benzol. Air and gases or vapors which do not chemically react with the treating reagent to any substantial or detrimental degree are fluid carriers coming within this invention.

Various organic liquids may be used as carriers for the treating reagent. In general, the liquid media should not exert any appreciable solvent or dispersing effect upon the pectinous material because of the mechanical difficulties involved in handling the mixtures when the pectin swells excessively. Although dilution of ethyl alcohol appears to increase the rate at which the setting time of the pectin is retarded, it is not ordinarily desirable to reduce the proportion of ethyl alcohol below about 40% by weight, of the total liquid, as further dilution gives rise to mechanical difficulties incident to the swelling and hydration of the pectin particles.

Reference has been made hereinabove to the effect of media consisting of methyl alcohol and an acid in speeding up the setting time. It should be noted that this effect is pronounced only at high concentrations of the methyl alcohol. Upon dilution, the tendency will be reversed and a retardation will be produced.

Acetone undiluted with water is a peculiarly effective retarding agent. Methyl ethyl ketone likewise has a very pronounced effect although this is not quite so great as the effect of acetone. The retardation obtained in a given time with either of these solvents is considerably less if the solvent is diluted to some extent with water.

It is to be understood that, in general, with higher temperatures it is advisable to use shorter time of treatment.

In evaluating the merits of the changes in setting time set forth herein, it is desirable to bear in mind that small differences in setting time as revealed herein represent very large differences in the effect produced when the pectins are employed under commercial conditions. Likewise, it should be borne in mind that the actual setting times given herein do not represent those obtained under commercial conditions. For example, a pectin which shows a setting time of 30 seconds under the conditions used herein would probably set in about 15 minutes in a commercial jam. A pectin showing herein a set of about 4 or 5 minutes would ordinarily set a commercial jelly in not less than a few hours.

It is to be understood that the test jellies referred to hereinabove were prepared in the manner described by C. P. Wilson in Ind. Eng. Chem., 28, 1303-7 (Nov. 1928).

In the appended claims the phraseology "treating pectinous material" is to be understood as referring to treatment of pectin-bearing source material prior to extraction therefrom of the pectin whose condition of solubility, characteristic setting time, and possibly other characteristics, are to be altered by the treatment referred to. Moreover, it is to be understood that in my preferred process the pectin is not dissolved out of the cellulosic source material with which it occurs in nature. It is converted to a water-soluble form in situ.

Although specific materials have been mentioned as suitable reagents for the process of this invention, they have been set forth for the purpose of illustration only, and the invention is not limited thereto. Any and all changes, modifications, or alterations coming within the scope of the appended claims are to be considered embraced thereby.

I claim:

1. A method of treating pectinous material which comprises contacting the pectinous material with an acidic reagent incapable of dissolving the pectin to any appreciable extent, the reagent being adapted to materially alter the intrinsic setting time of the pectin to be extracted therefrom, the pectinous material being maintained in contact with the reagent for a period of time and at a temperature insufficient to destroy the gelatin characteristics of the pectin to be extracted, but sufficient to materially alter the intrinsic setting time thereof.

2. A method as defined in claim 1 in which the reagent comprises an acid.

3. A method as defined in claim 1 in which the reagent comprises an acidic gas.

4. A method as defined in claim 1, in which the reagent comprises hydrogen chloride.

5. A method as defined in claim 1, in which the reagent comprises chlorine.

6. A method as defined in claim 1, in which the reagent comprises sulfur dioxide.

7. A method of treating pectinous material as defined in claim 1 in which the reagent comprises an organic liquid and an acidic component.

8. A method of treating pectinous material as defined in claim 1 in which the reagent comprises a water-miscible organic liquid and an acid.

9. A method of treating pectinous material as defined in claim 1 in which the reagent comprises a water-miscible organic liquid, an acid, and water in quantity insufficient to exert a material solvent action upon the pectin.

10. A method of treating pectinous material as defined in claim 1 in which the reagent comprises an organic liquid containing a methyl radical, and an acid.

11. A method of treating pectinous material as defined in claim 1 in which the reagent comprises an organic liquid containing the acetyl radical, and an acid.

12. A method as defined in claim 1 in which the reagent comprises a non-dispersing liquid medium incapable of dissolving the pectin to any appreciable extent, and an acid, the reagent being in sufficient quantity to completely moisten the pectinous material.

13. A method of treating pectinous material whereby the setting time of the pectin to be extracted therefrom is altered, which comprises contacting the pectinous material with a carrier having substantially no solvent or dispersing action on the pectin, such carrier containing an acidic component, and maintaining the carrier and its acid radical in contact with the pectinous material for a time sufficient to materially alter the setting time of the pectin to be extracted.

14. A method as defined in claim 13 in which the pectinous material is washed after contact to diminish residual acidity thereof.

15. A method of treating pectinous material as defined in claim 1 in which the reagent comprises an organic liquid containing a saturated alkyl group, and an acid.

16. A method of treating pectinous material as defined in claim 1 in which the reagent comprises an organic liquid incapable of dissolving the pectin to any appreciable extent, and an acid.

17. A method of treating pectinous material whereby the setting time of the pectin to be extracted therefrom is altered, comprising contacting the pectinous material with an acidic reagent incapable of dissolving the pectin to any appreciable extent and maintaining such contact for a time sufficient to materially alter the setting time of the pectin, but insufficient to destroy the gelation characteristics of the pectin, then separating the pectinous material from the acidic reagent and washing the pectinous material to diminish residual acidity thereof.

18. A method of treating pectinous material which comprises contacting the pectinous material with a liquid acidic reagent incapable of dissolving the pectin to any appreciable extent, the reagent being adapted to materially alter the condition of solubility of the pectin, the pectinous material being maintained in contact with the reagent for a period of time and at a temperature insufficient to destroy the gelation characteristics of the pectin to be extracted, but sufficient to convert the pectin into a water-soluble form.

19. A method of treating pectinous material which comprises contacting the pectinous material with a liquid acidic reagent incapable of dissolving the pectin to any appreciable extent, the reagent comprising an acid and an organic liquid in which substances accompanying the pectin are soluble, but in which pectin itself is practically insoluble, the reagent being adapted to materially alter the condition of solubility of the pectin, the pectinous material being maintained in contact with the reagent for a period of time and at a temperature insufficient to destroy the gelation characteristics of the pectin to be extracted but sufficient to convert the pectin into water-soluble form.

20. A method of treating pectinous material which comprises contacting the pectinous material with a reagent incapable of dissolving the pectin to any appreciable extent, the reagent comprising an alcohol and an acid, and the contact being maintained for a period of time and at a temperature insufficient to destroy the gelation characteristics of the pectin but sufficient to convert the pectin into water-soluble form.

21. A method of treating pectinous material which comprises contacting the pectinous material with an acidic reagent incapable of dissolving the pectin to any appreciable extent, the reagent being adapted to materially alter the condition of solubility of the pectin, the pectinous material being maintained in contact with the reagent for a period of time and at a temperature insufficient to destroy the gelation characteristics of the pectin to be extracted, but sufficient to render the pectin substantially water soluble.

22. A method of treating pectinous material as defined in claim 1, in which the reagent comprises an acid and an alcohol.

23. A method of treating pectinous material as defined in claim 1, in which the reagent comprises an acid and a ketone.

24. A method of treating pectinous material as defined in claim 1, in which the reagent comprises an acid and benzol.

GLENN HOWE JOSEPH.